Aug. 7, 1934.  C. W. RYERSON  1,969,330
TIRE COVER
Filed July 9, 1931
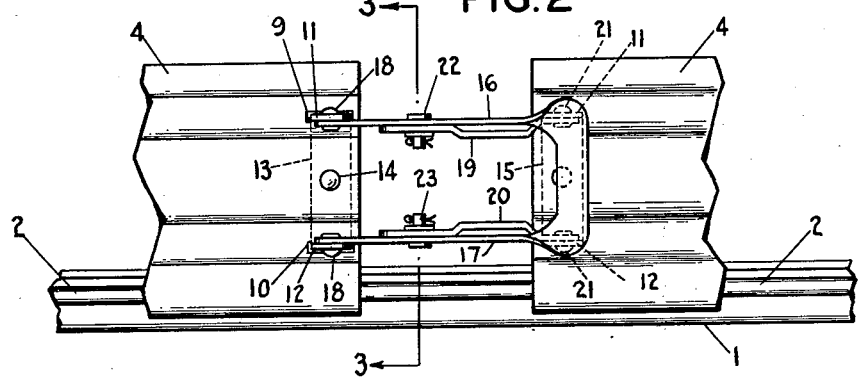
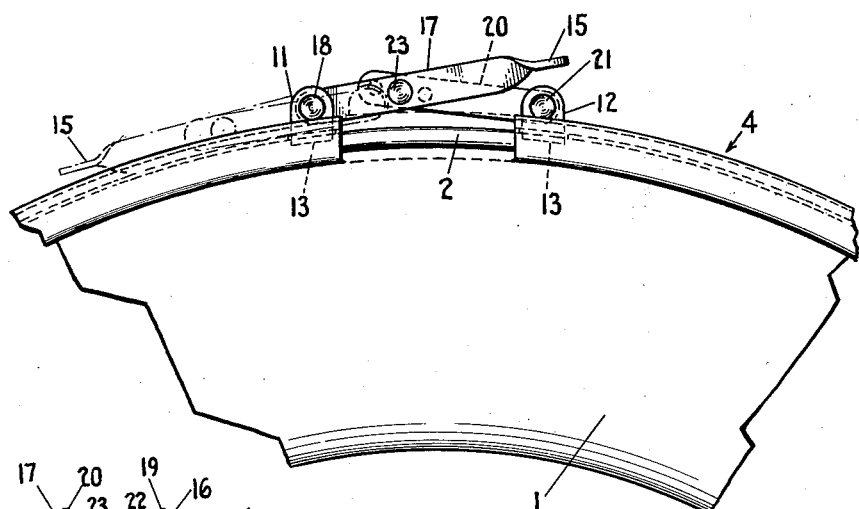
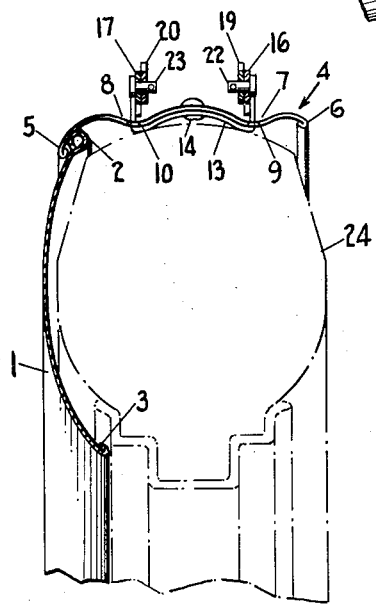
FIG. 2
FIG. 1
FIG. 3
INVENTOR
Creighton W. Ryerson
BY HIS ATTORNEY Patented Aug. 7, 1934

1,969,330

UNITED STATES PATENT OFFICE 1,969,330

TIRE COVER

Creighton W. Ryerson, Jackson, Mich., assignor to Ryerson & Haynes, Inc., a corporation of Michigan Application July 9, 1931, Serial No. 549,594

4 Claims. (Cl. 150—54)

This invention relates to covers for spare tires for automobiles.

In the past it has been proposed to make a tire cover of two parts having a side disk and a tread ring or hoop transversely split. The ring has been made of very stiff spring material capable of holding the side disk to the tire by its own resiliency. To apply the ring of this type of cover it is necessary to grasp the open ends of the ring and forcibly separate them against the tension of the metal until it has been expanded large enough to pass over the tire after which it is released and the ring springs into place. There has been great objection from users of this type of cover due to the manner in which the ring is applied and removed.

I have overcome the disadvantages of this type of cover by devising a substantially non-resilient ring. Since the ring is flexible and has substantially no spring action I use tightening means fastened to the ends of the ring to clamp it in place and thus avoid the labor incident to applying the strong spring ring of prior devices. My tire cover may be applied by anyone, even by a child, as no strength is required in clamping the cover in place.

Referring to the drawing, Fig. 1 is an elevation of a portion of the side disk and the top ring.

Fig. 2 is a plan view of the parts shown in Fig. 1.

Fig. 3 is an end view of a portion of the tire taken on the section line 3—3 and viewed in the direction of the arrows.

The tire cover consists of a side disk 1 of toroidal shape and concave, as shown particularly in Fig. 3 so that it virtually takes the form of a circular trough. The concave may take the general form of the tire although this is not essential. The periphery of the disk is turned back on itself at 2 to form a bead and the inner edge is preferably turned back as at 3 so as to eliminate all sharp edges that might injure the hands in handling the tire cover. The remaining section of the cover consists of an open ended ring 4 which has the edges 5 and 6 turned back or beaded, as shown. The cover or tread portion is preferably corrugated at 7 and 8. Since the cover is made of light material these corrugations and side beads and the general concavity furnishes the desired rigidity. The cover adjacent one end has two slots 9 and 10 to receive the ears 11 and 12 of a channel shaped strap, the ears being joined by a base portion 13 extending across the top of the inner side. The strap may be riveted at one or more places by rivets such as 14, or it may be spot-welded or otherwise secured to the ring. A similar strap is fastened to the opposite end of the ring as shown particularly in Fig. 2.

The U-shaped lever has a handle portion 15 connected to leg portions 16, 17, pivoted by pins 18 to the ears 11 and 12 on one of the ends of the ring. Levers 19 and 20 are pivoted at one end to the ears 11 and 12 of the strap on the opposite end of the ring, pin 21 being used for this purpose. The opposite ends of the levers 19, 20, are pivoted by pins 23 and 22 to the legs 16 and 17 of the U-shaped lever. There are a plurality of holes in the lever 20 so that the pin may pass through them and thus furnish adjustment to accommodate slight variation in the tire sizes.

The levers may be of any form, but by way of example I have shown them as made of flat stock arranged with the plane of the legs substantially perpendicular to the cover and the handle portion twisted at right angles, all of which is shown clearly in the drawing.

To apply the cover to a tire such as is generally indicated diagrammatically at 24, one places the side disk 1 against the rear face of the tire as it stands in the rear tire carrier. The handle 15 is rotated to the position shown in Fig. 2, which separates the ends of the ring. This ring is then inserted over the tire with the rear edge overlapping the top edge of the disk. The handle 15 is then grasped and the U-shaped lever rotated to the left in Fig. 2. This causes the two ends of the ring to approach each other and firmly clamps the cover in place on the tire and grips the disk 1 so that it is held in position. When the handle is rotated to closed position, as described, it will occupy the position shown in dotted lines in Fig. 1. In closed position the pins 23, 22, are below the line through the center of the pins 18 and 21. The slight compression on the rubber tread of the tire therefore holds the levers in closed position.

To remove the cover the handle would be moved to the right in Fig. 2 or clockwise in Fig. 1, and the ends are spread sufficiently to enable the ring to be removed. This action also releases the disk and both parts of the cover can be taken from the tire. In case the tire cover is used on spare tires in fender wheels it will be necessary to apply the cover before the spare tire is placed in the well. To do this the tire may be laid in flat position and the disk 1 applied to the top side. The extended ring may be then slid over the tire and clamped in position, as previously described. Of course if desired this method of applying the tire may be used regardless of whether the tire is used on the rear carrier or in the fender wheels.

I preferably make the parts 1 and 4 of the cover of thin sheet metal so that they can be painted, enameled or plated in any way to match or contrast with the decoration of the automobile. In some cases it is desirable to chromium or nickel plate both of the parts or one of them only, the remaining part being painted or enameled.

Also if desired, the parts 1 and 4 may be made of stiff non-metallic material such as fibre board, or bakelite reinforced by fabric such as used for panels for radio sets, but it would be of much finer material to make them flexible, particularly the tread ring.

Various other fastening devices may be used to draw the tread ring in place, such as a turn buckle, without departing from the spirit of the invention.

Having described my invention, what I claim is:

1. In tire covers, a round metal side piece adapted to cover one side of a tire, a transversely split metal hoop adapted to cover the tread of the tire, said hoop having circumferential corrugations, the outside edges of which extend downwards to extend over the periphery of said side piece and the opposite edge of the tread of the tire, a lever fastened to one end of the hoop and a link having one end fastened to the other end of said hoop and the other end to said lever.

2. In tire covers, a round metal side piece adapted to cover one side of a tire, a transversely split metal hoop adapted to cover the tread of the tire and to extend over the periphery of said side piece, levers pivoted to the open ends of said hoop there being a plurality of holes in said levers, a pin passing through said holes, and a handle secured to one of said levers and adapted to engage the hoop when said pin is below the center line joining the pivot points of the levers to hold the hoop and side piece on the tire, said plurality of holes permitting adjustment to fit the cover to varying sizes of tires.

3. In tire covers, a round metal side piece adapted to cover one side of a tire, a transversely split metal hoop adapted to cover the tread of the tire and to extend over the periphery of said side piece, a pair of ears secured to each end of the hoop, a U-shaped lever having its free ends pivoted to one pair of ears, levers pivoted to the other pair of ears and a pin securing said last mentioned levers to the first mentioned lever, said pin being positioned below the center line joining the pivot points when the cross piece of the U-shaped levers engages the hoop.

4. In tire covers, a round metal side piece adapted to cover one side of a tire, a transversely split metal hoop adapted to cover the tread of the tire and extend over the periphery of said side piece, U-shaped straps having their ends extending through the hoop adjacent each end and secured thereto, a U-shaped lever pivoted to the protruding ends of one of said straps, levers pivoted to the protruding ends of the other strap and pins pivoting the first mentioned levers to the second mentioned levers.

CREIGHTON W. RYERSON.